United States Patent
Choi et al.

(10) Patent No.: US 7,499,359 B2
(45) Date of Patent: Mar. 3, 2009

(54) TEMPERATURE SENSOR INSTRUCTION SIGNAL GENERATOR AND SEMICONDUCTOR MEMORY DEVICE HAVING THE SAME

(75) Inventors: Jong-Hyun Choi, Suwon-si (KR);
Dong-Il Seo, Yongin-si (KR); Yong-Gu Kang, Seoul (KR); Jung-Yong Choi, Seongnam-si (KR); Young-Hun Seo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 312 days.

(21) Appl. No.: 11/354,125

(22) Filed: Feb. 15, 2006

(65) Prior Publication Data
US 2006/0195289 A1   Aug. 31, 2006

(30) Foreign Application Priority Data
Feb. 16, 2005   (KR) .................. 10-2005-0012896

(51) Int. Cl.
*G11C 7/00* (2006.01)
(52) U.S. Cl. .................. 365/222; 365/226; 365/227; 365/228; 365/229
(58) Field of Classification Search ............. 365/222, 365/226, 227, 228, 229
See application file for complete search history.

(56) References Cited

U.S. PATENT DOCUMENTS

| 5,627,791 | A | * | 5/1997 | Wright et al. ............... 365/222 |
| 5,784,328 | A | | 7/1998 | Irrinki et al. |
| 5,828,619 | A | * | 10/1998 | Hirano et al. ............... 365/222 |
| 5,959,925 | A | * | 9/1999 | Tatsumi ....................... 365/222 |
| 6,564,288 | B2 | | 5/2003 | Olarig et al. |
| 6,608,790 | B2 | | 8/2003 | Tran et al. |
| 6,735,546 | B2 | | 5/2004 | Scheueriein |
| 2002/0097625 | A1 | * | 7/2002 | Hashimoto .................. 365/222 |

(Continued)

FOREIGN PATENT DOCUMENTS

TW   200404307   3/2004

OTHER PUBLICATIONS

Jae-Yoon Sim et al., Double Boosting Pump, Hybrid Current Sense Amplifier, and Binary Weighted Temperature Sensor Adjustment Schemes for 1.8V 128Mb Mobile DRAMs, 2002, IEEE, 2002 Symposium On VLSI Circuits Digest of Technical Papers, pp. 294-297.*

(Continued)

*Primary Examiner*—Hoai V Ho
*Assistant Examiner*—Jay Radke
(74) *Attorney, Agent, or Firm*—Harness, Dickey & Pierce PLC (57) ABSTRACT

A temperature sensor instruction signal generator, which may drive a temperature sensor, and a semiconductor memory device including the same. The temperature sensor instruction signal generator may generate an instruction signal that instruct the operation of the temperature sensor using at least one of a master clock (CLK) signal, a clock enable (CKE) signal, a row address selection (RAS) signal, a column address selection (CAS) signal, a write enable (WE) signal, and a chip selection (CS) signal, wherein the instruction signal may be enabled corresponding to at least one of a self refresh mode, an auto refresh mode, and a long tRAS mode. The semiconductor memory device may include a temperature sensor and the temperature sensor instruction signal generator.

8 Claims, 9 Drawing Sheets

U.S. PATENT DOCUMENTS

2004/0199730 A1    10/2004  Eggers et al.
2004/0218458 A1*  11/2004  Schneider et al. ........... 365/232

OTHER PUBLICATIONS

Jae-Yoon Sim et al., A 1.8V 128-Mb Mobile DRAM With Double Boosting Pump, Hybrid Current Sense Amplifier, and Dual-Refrenced Adjustment Scheme for Temperature Sensor, Apr. 2003, IEEE, IEEE Journal of Solid State Circuits, vol. 38, No. 4, pp. 631-640.*

Jae-Yoon Sim et al., "Double Boosting Pump, Hybrid Current Sense Amplifier, and Binary Weighted Temperature Sensor Adjustment Schemes for 1.8V 128Mb Mobile DRAMs.", 2002, IEEE, 2002 Symposium on VLSi Circuits Digest of Technical Papers, pp. 294-297.

Taiwanese Office Action dated May 7, 2008 (with translation) for corresponding Taiwanese Application No. 095105297.

* cited by examiner

TEMPERATURE SENSOR INSTRUCTION SIGNAL GENERATOR AND SEMICONDUCTOR MEMORY DEVICE HAVING THE SAME

CLAIM OF PRIORITY

A claim of priority is made under 35 U.S.C. 119 to Korean Patent Application No. 10-2005-0012896, filed on Feb. 16, 2005, in the Korean Intellectual Property Office, the disclosure of which is incorporated herein in its entirety by reference.

BACKGROUND OF THE INVENTION

1. Field of the Invention

Example embodiments of the present invention relate to a semiconductor memory device. More particularly, example embodiments of the present invention relate to a temperature sensor instruction signal generator for a temperature sensor, and a semiconductor memory device having the temperature sensor instruction signal generator.

2. Description of the Related Art

In a semiconductor memory device, for example a DRAM, over time, stored data in a cell may be lost due to automatic discharge of the cell. The stored data may be recovered in response to a control signal of a controller. The recovery of the data may consume a specific amount of current even if the DRAM is not in operation, and such a recovery process is generally known as a refresh operation.

A temperature of a semiconductor memory device may increase due to both heat applied from devices surrounding the semiconductor memory device and/or heat generated by a refresh operation. The automatic discharge in the semiconductor memory device may be due to leakage current, and the discharge may also be related to the temperature of the semiconductor memory device.

As discussed above, a refresh operation may be required to restore the data, and the amount of leakage current should be taken into consideration for the refresh operation. The temperature of the semiconductor memory device may substantially influence the refresh period.

Although a temperature sensor may be embedded into a semiconductor memory device to measure (for example, directly) the temperature of the semiconductor memory, a specific amount of current may be consumed during the temperature reading. The operation of the temperature sensor may produce a counter effect, because the temperature sensor may consume additional current.

SUMMARY OF THE INVENTION

In an example embodiment of the present invention, a temperature sensor instruction signal generator adapted to generate an instruction signal to instruct an operation of an temperature sensor may use at least one of a master clock (CLK) signal, a clock enable (CKE) signal, a row address selection (RAS) signal, a column address selection (CAS) signal, a write enable (WE) signal, and a chip selection (CS) signal. The instruction signal may be enabled corresponding to at least one of a self-refresh mode, an auto-refresh mode, and a long tRAS mode.

In another example embodiment of the present invention, a temperature sensor operation instruction signal generator may include at least two of a first temperature sensor operation instruction generating block which outputs a first operation instruction signal that instructs the operation of the temperature sensor in the self refresh mode, a second temperature sensor operation instruction generating block which outputs a second operation instruction signal that instructs the operation of the temperature sensor in the auto refresh mode, and a third temperature sensor operation instruction signal generating block which outputs a third operation instruction signal that instructs the operation of the temperature sensor in the long tRAS mode, and an operation instruction signal selecting/generating block which selects one of output signals of the at least two temperature sensor operation instruction generating blocks and outputs the selected signal as the operation instruction signal.

In another example embodiment of the present invention, a semiconductor memory device may include a temperature sensor configured to measure a temperature of the semiconductor memory device and configured to output a temperature information signal containing information related to the measured temperature in response to an instruction signal, and a temperature sensor instruction signal generating circuit configured to generate the instruction signal to instruct the operation of the temperature sensor using at least one of CLK, CKE, CAS, WE, and CS signals in response to the temperature information signal. The instruction signal may correspond to at least one of a self refresh mode and an auto refresh mode.

In another example embodiment of the present invention, a semiconductor memory device may include a first temperature sensor configured to measure the temperature of the semiconductor memory device and configured to output a first temperature information signal containing information related to the measured temperature in response to a first instruction signal, a second temperature sensor configured to measure the temperature of the semiconductor memory device and output a second temperature information signal containing information related to the measured temperature in response to a second instruction signal, and a temperature sensor instruction signal generating circuit configured to generate the first instruction signal to instruct the operation of the first temperature sensor and the second instruction signal to instruct the operation of the second temperature sensor using at least one of the CLK, CKE, RAS, CAS, WE, and CS signals. The first instruction signal may correspond to a self refresh mode, and the second instruction signal may correspond to an auto refresh mode.

In another example embodiment of the present invention, a method of generating an instruction signal may include generating the instruction signal by using at least one of a master clock (CLK), a clock enable (CKE) signal, a row address selection (RAS) signal, a column address selection (CAS) signal, a write enable (WE) signal, and a chip selection (CS) signal, wherein the instruction signal is enabled corresponding to at least one of a self-refresh mode, an auto-refresh mode, and a long tRAS mode.

In another example embodiment of the present invention, a method of generating an instruction signal may include generating an instruction signal to control operation of a temperature sensor using at least one of CLK, CKE, CAS, WE, and CS signals, wherein the instruction signal corresponds to at least one of a self refresh mode and an auto refresh mode, measuring a temperature of a semiconductor memory device, and outputting a temperature information signal containing information related to the measured temperature in response to the instruction signal.

BRIEF DESCRIPTION OF THE DRAWINGS

The present invention will become more apparent by describing in detail example embodiments thereof with reference to the attached drawings in which.

DETAILED DESCRIPTION OF EXAMPLE EMBODIMENTS

The attached drawings illustrate example embodiments of the present invention and are referred to in order to gain an understanding of the present invention, and aspects thereof.

Hereinafter, the present invention will be described in detail by explaining example embodiments of the invention with reference to the attached drawings. Like reference numerals in the drawings may denote similar elements.

Figure 1:
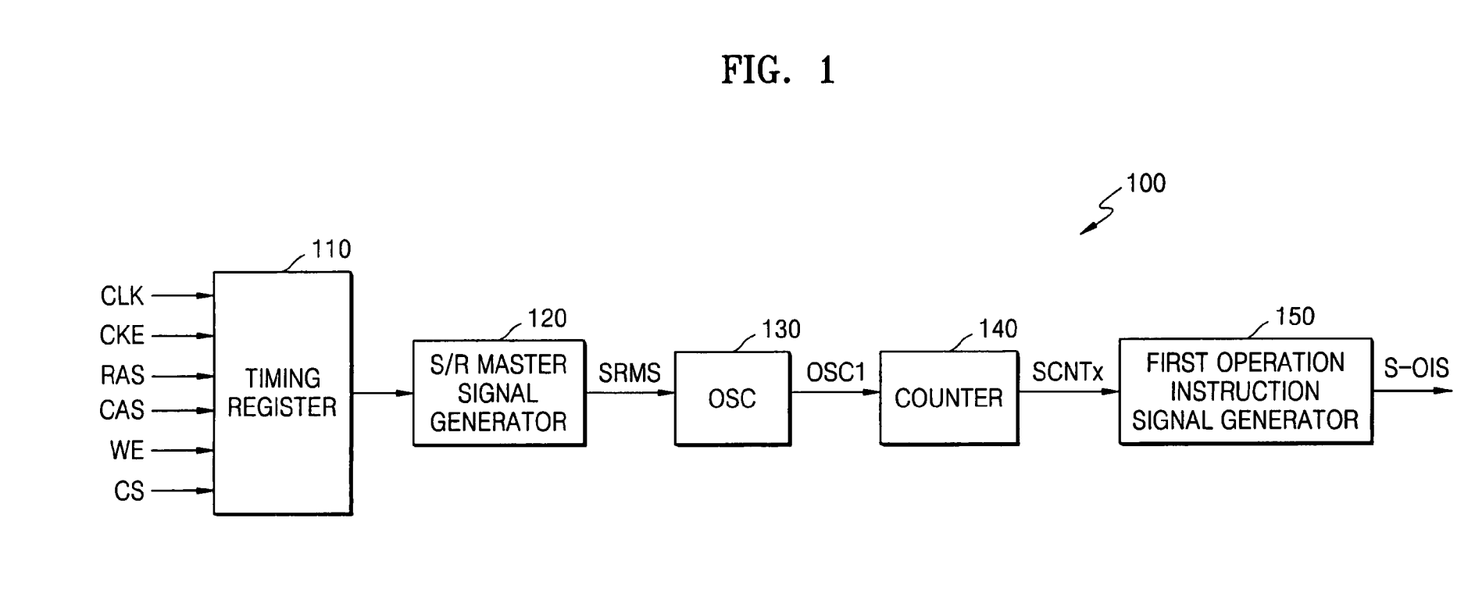
FIG. 1 is a block diagram of a temperature sensor operation instruction signal generator according to an example embodiment of the present invention.

FIG. 1 is a block diagram of a temperature sensor operation instruction signal generator 100 according to an example embodiment of the present invention. Referring to FIG. 1, the temperature sensor operation instruction signal generator 100 that operates in a self refresh mode may include a timing register 110, a self/refresh (S/R) master signal generator 120, an oscillator 130, a counter 140, and a first operation instruction signal generator 150.

The timing register 110 may store and output at least one of CLK, CKE, RAS, CAS, WE, and CS signals.

The CLK signal may be a master clock signal; the CKE signal may be a clock enable signal; the RAS signal may be a row address selection signal; the CAS signal may be a column address selection signal; the WE signal may be a write enable signal; and the CS signal may be a chip selection signal.

The S/R master signal generator 120 may generate a self/refresh master signal SRMS using at least one of the CLK, CKE, RAS, CAS, WE, and CS signals stored in the timing register 110. The oscillator 130 may generate a first clock signal OSC1 having a desired frequency in response to the self/refresh master signal SRMS. The counter 140 may count the first clock signal OSC1. The first operation instruction signal generator 150 may select one SCNTx ($0 \leq x \leq n$) from a plurality of signals SCNT0 through SCNTn (n represents an integer) (not shown) output from the counter 140 and generate a first operation instruction signal S-OIS that instruct the operation of a temperature sensor.

Figure 2:
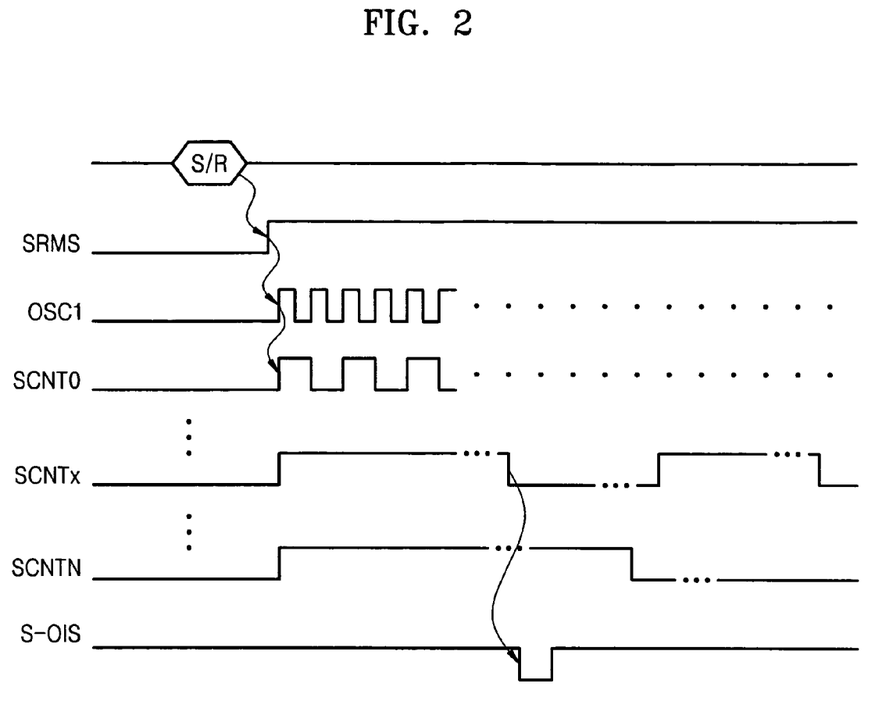
FIG. 2 illustrates a signal diagram of blocks included in the temperature sensor operation instruction signal generator of FIG. 1.

FIG. 2 illustrates a signal diagram of the temperature sensor operation instruction signal generator 100 of FIG. 1. Referring to FIG. 2, at a moment when it is detected that a semiconductor memory device including the temperature sensor operation instruction signal generator 100 will operate in a self refresh mode, the S/R master signal generator 120 may generate the SRMS using a combination of the six signals (CLK, CKE, RAS, CAS, WE, and CS signals).

The first clock signal OSC1 having a desired frequency may be generated at a rising edge or a falling edge of the SRMS. The frequency of the first clock signal OSC1 may relate to an operation speed of the semiconductor memory device. A first count signal SCNT0 may be generated by counting the first clock signal OSC1. A second count signal SCNT1 (not shown) may be generated using the first count signal SCNT0, and sequentially, n count signals SCNTn (n represent an integer) may be generated. A first operation instruction signal S-OIS may be generated using a count signal SCNTx ($0 \leq x \leq n$) of the plurality of count signals SCNT0 through SCNTn.

When a semiconductor memory device operates in the self refresh mode, the operation of the temperature sensor configured inside or outside the semiconductor memory device may be controlled by a first operation instruction signal S-OIS, and therefore, the operation of the temperature sensor may be properly maintained.

Figure 3:
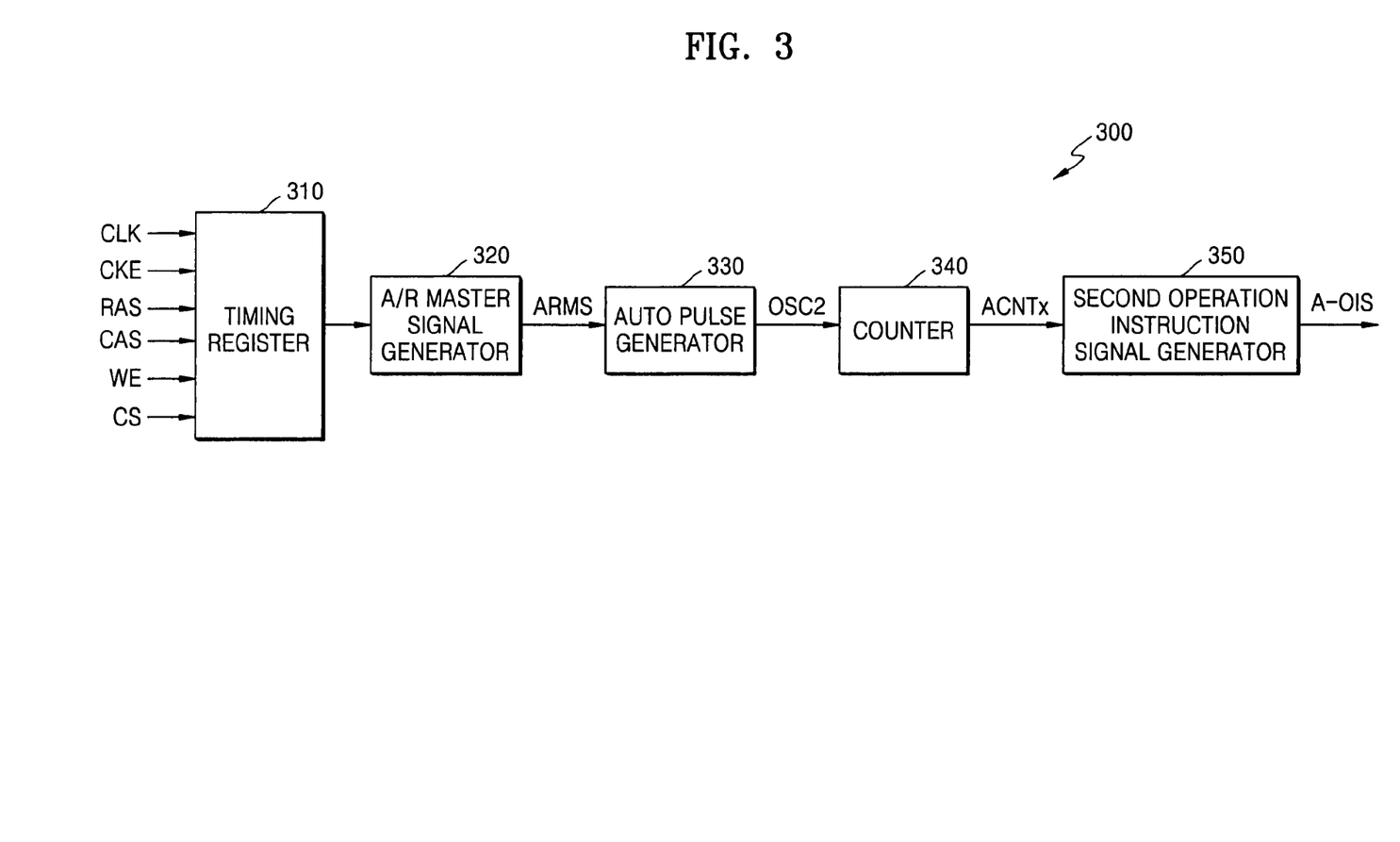
FIG. 3 is a block diagram of a temperature sensor operation instruction signal generator according to another example embodiment of the present invention.

FIG. 3 is a block diagram of a temperature sensor operation instruction signal generator 300 according to another embodiment of the present invention. Referring to FIG. 3, the temperature sensor operation instruction signal generator 300 that operates in an auto refresh mode may include a timing register 310, an auto/refresh (A/R) master signal generator 320, an auto pulse generator 330, a counter 340, and a second operation instruction signal generator 350.

The timing register 310 may store and output at least one of CLK, CKE, RAS, CAS, WE, and CS signals.

The A/R master signal generator 320 may generate an auto/refresh master signal (ARMS) from at least one of CKS, CKE, RAS, CAS, WE, and CS signals stored in the timing register 310. The auto pulse generator 330 may generate an auto pulse signal OSC2 in response to the ARMS. The counter 340 may count the auto pulse signal OSC2. The second operation instruction signal generator 350 may select a signal ACNTx ($0 \leq x \leq n$) from a plurality of signals ACNT0 through ACNTn (n represents an integer) (not shown) output from the counter 340, and may generate a second operation instruction signal A-OIS that may instruct the operation of the temperature sensor.

Figure 4:
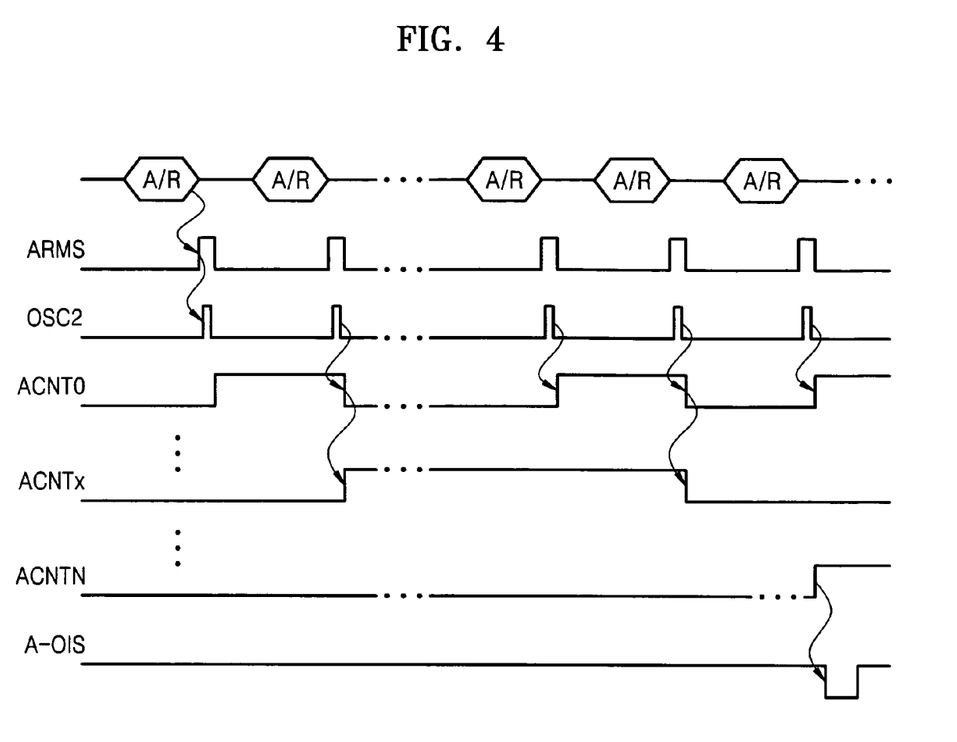
FIG. 4 illustrates a signal diagram of blocks included in the temperature sensor operation instruction signal generator of FIG. 3.

FIG. 4 illustrates a signal diagram of the temperature sensor operation instruction signal generator 300 of FIG. 3. Referring to FIG. 4, at a moment it is detected that a semiconductor memory device having the temperature sensor operation instruction signal generator 300 operates in an auto refresh mode, the A/R master signal generator 320 may generate the ARMS using the combination of the six signals (CLK, CKE, RAS, CAS, WE, and CS signals).

The auto pulse signal OSC2 having a desired frequency may be generated at a rising edge or a falling edge of the ARMS. The frequency of the generated auto pulse signal OSC2 may be the same as the frequency of the ARMS. A first count signal ACNT0 may be generated by counting the auto pulse signal OSC2. A second count signal ACNT1 (not shown) may be generated using the first count signal ACNT0, and sequentially, n count signals ACNTn (n represents an integer) may be generated. The second operation instruction signal A-OIS that instructs the operation of the temperature sensor may be generated using a signal ACNTx ($0 \leq x \leq n$) of a plurality of counter signals ACNT0 through ACNTn.

When a semiconductor memory device operates in the auto refresh mode, the operation of the temperature sensor configured inside or outside the semiconductor memory device may be controlled by a second operation instruction signal A-OIS, and thus, the operation of the temperature sensor may be properly maintained.

Figure 5:
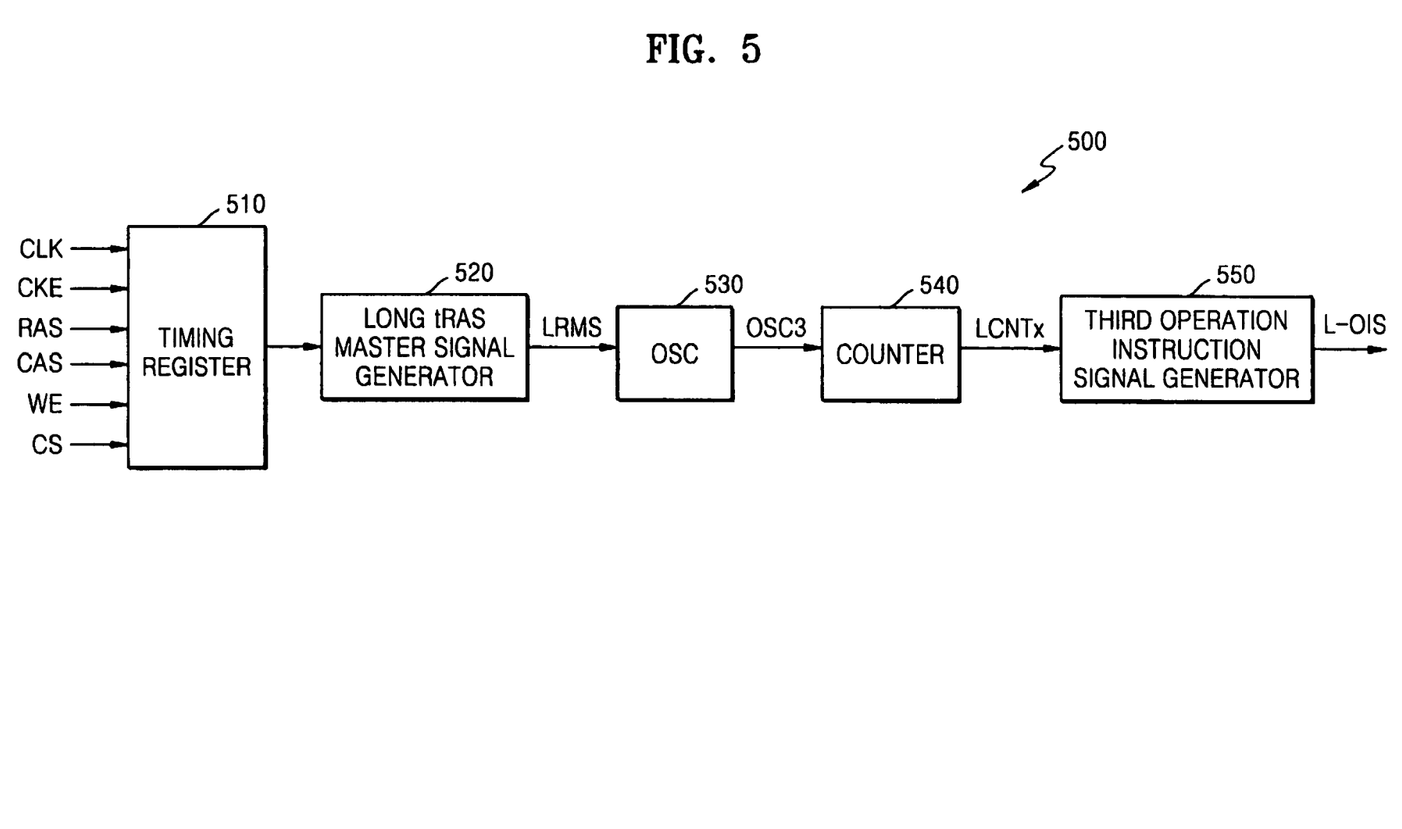
FIG. 5 is a block diagram of a temperature sensor operation instruction signal generator according to yet another example embodiment of the present invention.

FIG. 5 is a block diagram of a temperature sensor operation instruction signal generator 500 according to another embodiment of the present invention. Referring to FIG. 5, the temperature sensor operation instruction signal generator 500 operates in a long tRAS mode may include a timing register 510, a long tRAS master signal generator 520, an oscillator 530, a counter 540, and a third operation instruction signal generator 550.

The timing register may store and output at least one of CLK, CKE, RAS, CAS, WE, and CS signals.

The long tRAS master signal generator 520 may generate a long tRAS master signal (LRMS) using at least one of CLK, CKE, RAS, CAS, WE, and CS signals stored in the timing register 510. The oscillator 530 may generate a third clock signal OSC3 having a desired frequency in response to the LRMS. The counter 540 may count the third clock signal OSC3. The third operation instruction signal generator 550 may select a signal LCNTx ($0 \leq x \leq n$) from a plurality of signals LCNT0 through LCNTn (n represents an integer) (not shown) output from the counter 540 and generate a first operation instruction signal L-OIS that may instruct the operation of the temperature sensor.

Figure 6:
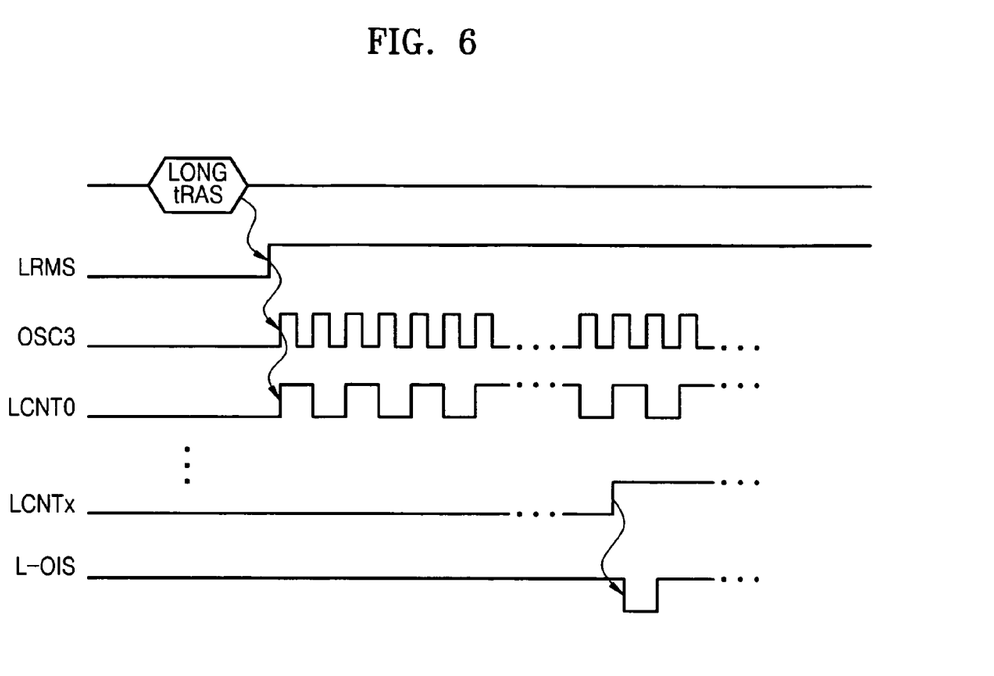
FIG. 6 illustrates a signal diagram of blocks included in the temperature sensor operation instruction signal generator of FIG. 5.

FIG. 6 illustrates a clock diagram of the temperature sensor operation instruction signal generator 500 of FIG. 5. Referring to FIG. 6, at the moment when it is detected that a semiconductor memory device having the temperature sensor operation instruction signal generator 500 may operate in a long tRAS mode, the long tRAS master signal generator 520 may generate the LRMS using the combination of the six signals (CLK, CKE, RAS, CAS, WE, and CS signals).

The third clock signal OSC3 having a desired frequency may be generated at a rising edge or a falling edge of the LRMS. The frequency of the generated third clock signal OSC3 may have a connection with the operating speed of the semiconductor memory device. A first count signal LCNT0 may be generated by counting the third clock signal OSC3. A second count signal LCNT1 (not shown) may be generated using the first count signal LCNT0, and sequentially n count signals LCNTn (n represents an integer) may be generated. The third operation instruction signal L-OIS that instructs the operation of the temperature sensor may be generated using one LCNTx ($0 \leq x \leq n$) of the plurality of count signals LCNT0 through LCNTn.

When the semiconductor memory device operates in the long tRAS mode, the operation of the temperature sensor configured inside or outside the semiconductor memory device may be controlled by the third operation instruction signal L-OIS, and thus the operation of the temperature sensor may be properly maintained.

Figure 7:
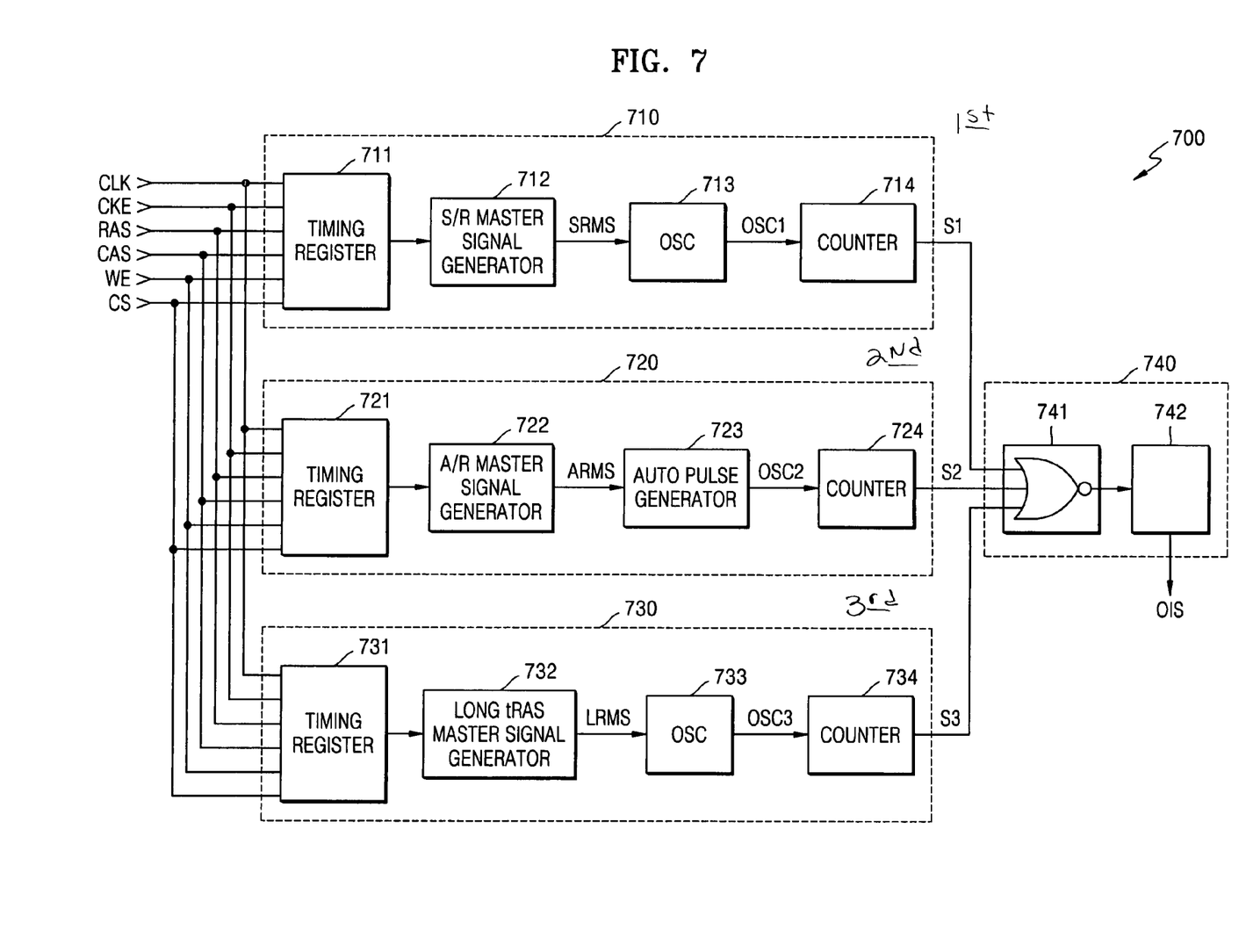
FIG. 7 is a block diagram of a temperature sensor operation instruction signal generator according to still another example embodiment of the present invention.

FIG. 7 is a block diagram of a temperature sensor operation instruction signal generator 700 according to another embodiment of the present invention. Referring to FIG. 7, the temperature sensor operation instruction signal generator 700 may include a first temperature sensor operation instruction signal generating block 710, a second temperature operation instruction signal generating block 720, a third temperature sensor operation instruction signal generating block 730, and an operation instruction signal selecting/generating block 740.

The first temperature sensor operation instruction signal generating block 710 may output a first operation instruction signal S1 that instruct the operation of a temperature sensor in a self refresh mode, and may include a timing register 711, a S/R master signal generator 712, a first oscillator 713, and a first counter 714.

The timing register 711 may store at least one of CLK, CKE, RAS, CAS, WE, and CS signals and output the signal to the S/R master signal generator 712. The S/R master signal generator 712 may generate a SRMS using at least one of the CLK, CKE, RAS, CAS, WE, and CS signals. The first oscillator 713 may generate a first clock signal OSC1 having a desired frequency in response to the SRMS. The first counter 714 may select one of the first counter signals SCNT0 through SCNTn (n represents an integer) (not shown) which may be generated by counting the first clock signal OSC1 and may output the signal as the first operation instruction signal S1.

The second temperature sensor operation instruction signal generating block 720 may output a second operation instruction signal S2 that instruct the operation of the temperature sensor in an auto refresh mode, and may include a timing register 721, an A/R master signal generator 722, an auto pulse generator 723, and a second counter 724.

The timing register 721 may store at least one of the CLK, CKE, RAS, CAS, WE, and CS signals and transmit at least one signal to the A/R master signal generator 722. The A/R master signal generator 722 may generate an ARMS using at least one of the CLK, CKE, RAS, CAS, WE, and CS signals. The auto pulse generator 723 may generate an auto pulse signal OSC2 in response to the ARMS. The second counter 724 may select at least one from a plurality of second counter signals ACNT0 through ACNTn (n represents an integer) (not shown) generated by counting the auto pulse AP and may output the pulse as the second operation instruction signal S2.

The third temperature sensor operation instruction signal generating block 730 may output a third operation instruction signal S3 that instruct the operation of the temperature sensor in a long tRAS mode, and may include a timing register 731, a long tRAS master signal generator 732, a second oscillator 733, and a third counter 734.

The timing register 731 may store at least one of the CLK, CKE, RAS, CAS, WE, and CS signals and transmit the signal to the long tRAS master signal generator 732. The long tRAS master signal generator 732 may generate a LRMS using at least one of the CLK, CKE, RAS, CAS, WE, and CS signals. The second oscillator 733 may generate a second clock signal OSC2 having a desired frequency in response to the LRMS. The third counter 734 may select at least one from a plurality of third counter signals LCNT0 through LCNTn (n represents an integer) (not shown) generated by counting the second clock signal OSC2 and may output the signal as the third operation instruction signal S3.

The operation instruction signal selecting/generating block 740 may receive the three operation instruction signals S1, S2, and S3 and output an operation instruction signal OIS, and may include a selector 741 and an operation instruction signal generating block 742.

The selector 741 may receive the three operation instruction signals S1 through S3 and select at least one of the three operation instruction signals S1 through S3, and may be implemented using a NOR circuit.

The operation instruction signal generating block 742 may generate the operation instruction signal OIS using the operation instruction signal selected by the selector 741.

The operation and the waveform characteristic of each of the blocks illustrated in FIG. 7 may be the same as those of the blocks illustrated in FIGS. 1, 3 and 5, and therefore, for brevity, the description thereof will be omitted.

Figure 8:
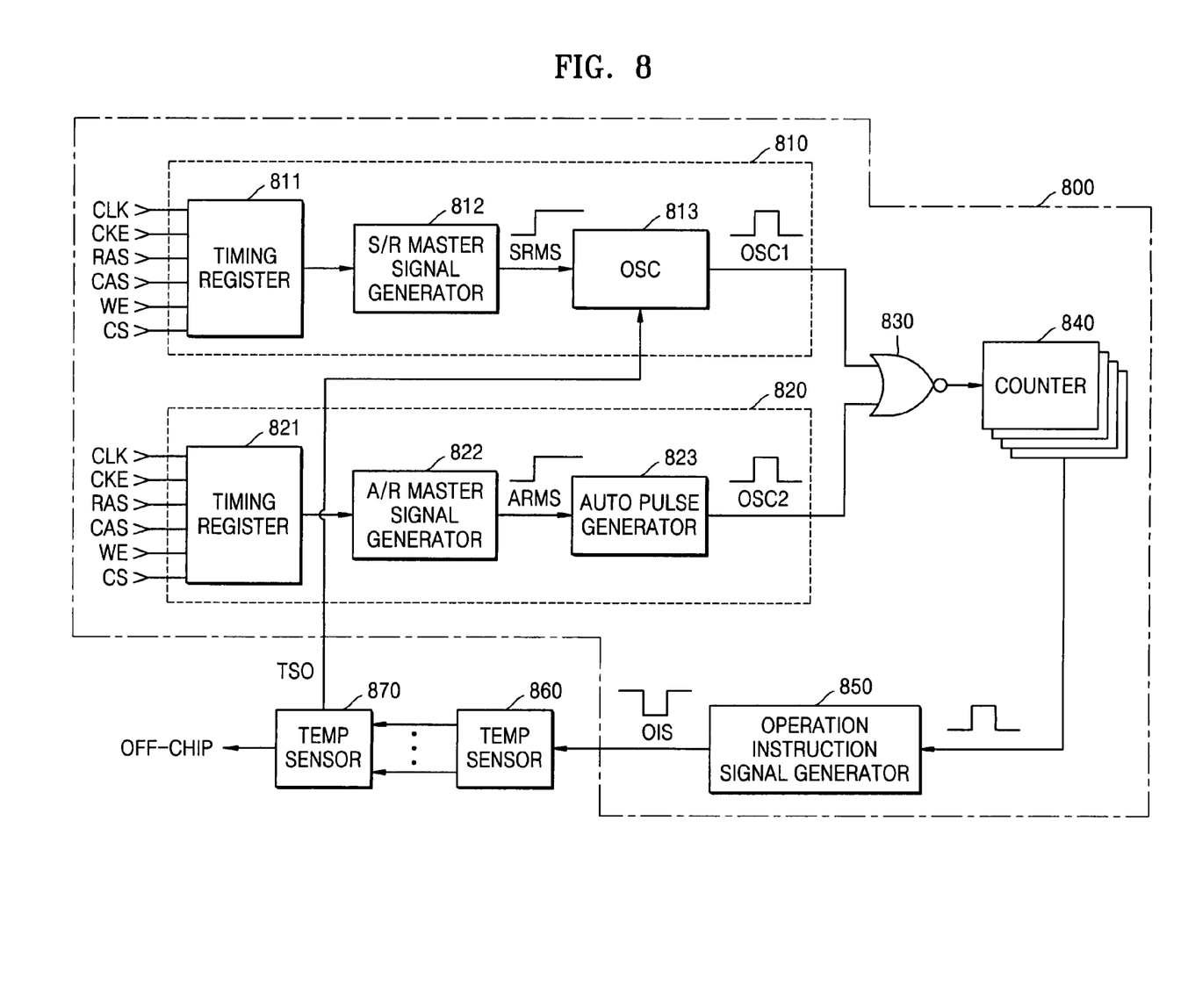
FIG. 8 illustrates a semiconductor memory device including a temperature sensor operation instruction signal generator according to an example embodiment of the present invention.

FIG. 8 illustrates a semiconductor memory device including a temperature sensor operation instruction signal generator 800 according to an example embodiment the present invention. Referring to FIG. 8, the semiconductor memory device may include the temperature sensor operation instruction signal generator 800 and a temperature sensor 860.

The temperature sensor 860 may measure the temperature of the semiconductor memory device and output a temperature information signal TSO containing information related to the measured temperature in response to an operation instruction signal OIS.

The temperature sensor operation instruction signal generator 800 may generate the operation instruction signal OIS that instruct the operation of a temperature sensor 870 using at least one of CLK, CKE, RAS, CAS, WE, and CS signals in response to the temperature information signal TSO, and may include a first temperature sensor operation instruction signal generating block 810, a second temperature sensor operation instruction signal generating block 820, a selector 830, a counter 840, and an operation instruction signal generator 850.

The first temperature sensor operation instruction signal generating block 810 may operate responding to the temperature information signal in a self refresh mode, and may generate a first signal OSC1 having a desired frequency using at least one of the CLK, CKE, RAS, CAS, WE, and CS signals. The first temperature sensor operation instruction signal generating block 810 may include a timing register 811, an S/R master signal generator 812, and an oscillator 813.

The timing register 811 may store at least one of the CLK, CKE, RAS, CAS, WE, and CS signals and transmit the signal to the S/R master signal generator 812. The S/R master signal generator 812 may generate an SRMS using at least one of the CLK, CKE, RAS, CAS, WE, and CS signals. The oscillator 813 may output the first clock signal OSC1 generated using the SRMS in response to the temperature information signal TSO.

The second temperature sensor operation instruction signal generating block 820 may operate in an auto refresh mode, and may generate an auto pulse signal OSC2 having a desired frequency using at least one of the CLK, CKE, RAS, CAS, WE, and CS signals. The second temperature sensor operation instruction signal generating block 820 may include a timing register 821, an A/R master signal generator 822, and an auto pulse generator 823.

The timing register 821 may store at least one of the CLK, CKE, RAS, CAS, WE, and CS signals and transmit the signals to the A/R master signal generator 822. The A/R master signal generator 822 may generate an ARMS using at least one of the CLK, CKE, RAS, CAS, WE, and CS signals. The auto pulse generator may output an auto pulse that may be generated in response to the ARMS as the auto pulse signal OSC2.

The selector 830 may select and output the first signal OSC1 or the auto pulse signal OSC2. The counter 840 may count the selected signal OSC1 or OSC2. The operation instruction signal generator 850 may generate the operation instruction signal OIS that instruct the operation of the temperature sensor using one of a plurality of signals which may have been counted by the counter 840.

Figure 9:
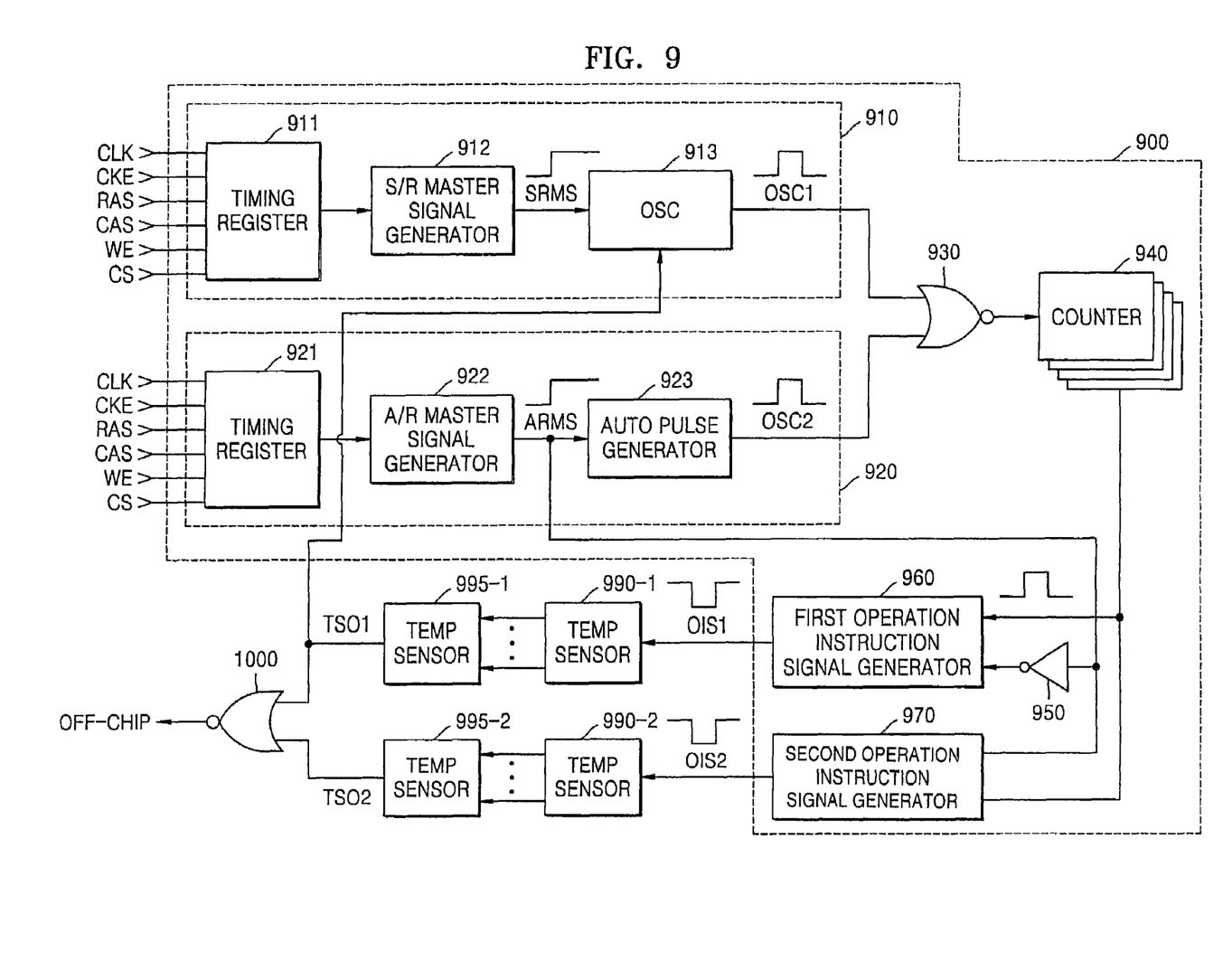
FIG. 9 illustrates a semiconductor memory device including a temperature sensor operation instruction signal generator according to another example embodiment of the present invention.

FIG. 9 illustrates a semiconductor memory device including a temperature sensor operation instruction signal generator according to another example embodiment the present invention. Referring to FIG. 9, the semiconductor memory device may include a first temperature sensor 990-1, a second temperature sensor 990-2, and a temperature sensor operation instruction signal generating circuit 900.

The first temperature sensor 990-1 may measure the temperature of the semiconductor memory device and output a first temperature information signal containing information TSO1 relating to a measured temperature in response to a first operation instruction signal OIS1.

The second temperature sensor 990-2 may measure the temperature of the semiconductor memory device and output a second temperature information signal containing information TSO2 relating to a measured temperature in response to a second operation indication signal OIS2.

The temperature sensor operation instruction signal generating circuit 900 may generate the first operation instruction signal OIS1 that instruct the operation of the first temperature sensor 990-1 and the second operation instruction signal OIS2 that instruct the operation of the second temperature sensor 990-2 using at least one of CLK, CKE, RAS, CAS, WE, and CS signals, in response to the first temperature information signal TSO1. The first operation instruction signal OIS1 may correspond to a self refresh mode, and a second operation instruction signal OIS2 may correspond to an auto refresh mode.

The temperature sensor operation instruction signal generating circuit 900 may include a first temperature sensor operation instruction signal generating block 910, a second temperature sensor operation instruction signal generating block 920, a selector 930, a counter 940, an inverter 950, a first operation instruction signal generator 960, and a second operation instruction signal generator 970.

The first temperature sensor operation instruction signal generating block 910 may operate in responds to the first temperature information signal TSO1 in the self refresh mode, and may generate a first signal OSC1 having a desired frequency using at least one of the CLK, CKE, RAS, CAS, WE, and CS signals. The first temperature sensor operation instruction signal generating block 910 may include a timing register 911, an S/R master signal generator 912, and an oscillator 913.

The timing register 911 may store at least one of the CLK, CKE, RAS, CAS, WE, and CS signals and transmit the signal to the S/R master signal generator 912. The S/R master signal generator 912 may generate an SRMS using at least one of the CLK, CKE, RAS, CAS, WE, and CS signals. The oscillator 913 may output the first signal OSC1 generated using the SRMS in response to the first temperature information signal TSO1.

The second temperature sensor operation instruction signal generating block 920 may operate in the auto refresh mode, generate an ARMS using at least one of the CLK, CKE, RAS, CAS, WE, and CS signals, and may generate a second signal OSC2 having a desired frequency using the auto pulse master signal ARMS.

The second temperature sensor operation instruction signal generating block 920 may include a timing register 921, an A/R master signal generator 922, and an auto pulse generator 923.

The timing register 921 may store at least one of the CLK, CKE, RAS, CAS, WE, and CS signals and transmit the signals to the A/R master signal generator 922. The A/R master signal generator 922 may generate an ARMS using at least one of the CLK, CKE, RAS, CAS, WE, and CS signals. The auto pulse generator 923 may output an auto pulse, which may have been generated in responds to the auto/refresh master signal ARMS, as the second signal OSC2.

The selector 930 may select and output either the first signal OSC1 or the second signal OSC2. The counter 940 may count the first signal OSC1 or the second signal OSC2 which may have been selected by the selector 930.

The first operation instruction signal generator 960 may generate the first operation instruction signal OIS1 using a signal selected from a plurality of count signals counted by the counter 940 and a signal obtained by inverting the phase of the ARMS. An inverter 950 may receive and invert the phase of the ARMS.

The second operation instruction signal generator 970 may generate the second operation instruction signal OIS2 using a signal selected from a plurality of count signals counted by the counter 940 and the auto pulse master signal ARMS.

The first temperature information signal TSO1 and the second temperature information signal TSO2 output from the first temperature sensor 990-1 and the second temperature sensor 990-2, respectively, may be selected and transmitted to the outside of the semiconductor memory device by a selector 1000.

As described above, a temperature sensor operation instruction signal generator and a semiconductor memory device including the generator according to example embodiments of the present invention may allow a temperature sensor configured inside or outside the semiconductor memory device to detect the temperature of the semiconductor memory device and output to outside the semiconductor memory device or use the detecting result inside the semiconductor memory device, thus operating a temperature sensor corresponding to the temperature of the semiconductor memory device and achieving improved or maximum operating efficiency of the temperature sensor. Further, the temperature sensor may be driven in various modes, for example, a self refresh mode, an auto refresh mode, and a long tRAS mode.

While the present invention has been particularly shown and described with reference to example embodiments thereof, it will be understood by those of ordinary skill in the art that various changes in form and details may be made therein without departing from the scope of the present invention.

What is claimed is:

1. A semiconductor memory device comprising:
   a temperature sensor which measures the temperature of the semiconductor memory device and outputs a temperature information signal containing information about the measured temperature in response to an operation instruction signal; and
   a temperature sensor operation instruction signal generating circuit which generates the operation instruction signal that instructs the operation of the temperature sensor using at least one of CLK, CKE, CAS, WE, and CS signals in response to the temperature information signal,
   wherein the operation instruction signal corresponds to one of a self refresh mode and an auto refresh mode.

2. The semiconductor memory device of claim 1, wherein the temperature sensor operation instruction signal generating circuit comprises:
   a first temperature sensor operation instruction signal generating block which operates responding to the temperature information signal in the self refresh mode and generates a first signal having a given frequency using at least one of the CLK, CKE, RAS, CAS, WE, and CS signals;
   a second temperature sensor operation instruction signal generating block which operates in the auto refresh mode and generates a second signal having a given frequency using at least one of the CLK, CKE, RAS, CAS, WE, and CS signals;
   a selector which selects and outputs one of the first and second signals;
   a counter which counts the first signal or second signal selected by the selector; and
   an operation instruction signal generator which generates the operation instruction signal that instructs the operation of the temperature sensor using a signal among a plurality of count signals obtained by counting the first signal or second signal selected by the selector by the counter.

3. The semiconductor memory device of claim 1, wherein the first temperature sensor operation instruction signal generating block includes:
   a S/R master signal generator which generates a self/refresh master signal using at least one of the CLK, CKE, RAS, CAS, WE, and CS signals; and
   an oscillator which outputs the first signal generated using the self/refresh master signal in response to the temperature information signal.

4. The semiconductor memory device of claim 2, wherein the second temperature sensor operation instruction signal generating block comprises:
   an A/R master signal generator which generates an auto/refresh master signal using at least one of the CLK, CKE, RAS, CAS, WE, and CS signals; and
   an auto pulse generator which outputs an auto pulse generated in response to the auto/refresh master signal as the second signal.

5. A semiconductor memory device comprising:
   a first temperature sensor which measures the temperature of the semiconductor memory device and outputs a first temperature information signal containing information about the measured temperature in response to a first operation instruction signal;
   a second temperature sensor which measures the temperature of the semiconductor memory device and outputs a second temperature information signal containing information about the measured temperature in response to a second operation instruction signal;
   a temperature sensor operation instruction signal generating circuit which generates the first operation instruction signal that instructs the operation of the first temperature sensor and the second operation instruction signal that instructs the operation of the second temperature sensor using at least one of CLK, CKE, RAS, CAS, WE, and CS signals;
   a selector which selects one of the first and second signals and outputs the selected signal;
   a counter which counts the first signal or second signal selected by the selector;
   a first operation instruction signal generator which generates the first operation instruction signal using a count signal selected from a plurality of related count signals obtained by counting the first signal or second signal selected by the selector by the counter and a signal obtained by inverting the phase of the auto pulse master signal; and
   a second operation instruction signal generator which generates the second operation instruction signal using a count signal selected from a plurality of related count signals obtained by counting the first signal or second signal selected by the selector by the counter and the auto pulse master signal; and wherein the first operation instruction signal corresponds to a self refresh mode and the second operation instruction signal corresponds to an auto refresh mode.

6. The semiconductor memory device of claim 5, wherein the temperature sensor operation instruction signal generating circuit comprises:

a first temperature sensor operation instruction signal generating block which operates responding to the first temperature information signal in the self refresh mode and generates a first signal having a given frequency using at least one of the CLK, CKE, RAS, CAS, WE, and CS signals; and a second temperature sensor operation instruction signal generating block which operates responding to the second temperature information signal in the auto refresh mode, generates an auto pulse master signal using at least one of the CLK, CKE, RAS, CAS, WE, and CS signals, and generates a second signal having a given frequency using the auto pulse master signal.

7. The semiconductor memory device of claim 6, wherein the first temperature sensor operation instruction signal generating block includes:

a S/R master signal generator which generates a self/refresh master signal using at least one of the CLK, CKE, RAS, CAS, WE, and GS signals; and an oscillator which outputs the first signal generated using the self/refresh master signal in response to the first temperature information signal.

8. The semiconductor memory device of claim 6, wherein the second temperature sensor operation instruction signal generating block includes:

an A/R master signal generator which generates an auto/refresh master signal using at least one of the CLK, CKE, RAS, CAS, WE, and CS signals; and an auto pulse generator which outputs an auto pulse as the second signal, the auto pulse being generated in response to the auto/refresh master signal.

* * * * *